United States Patent
Miki et al.

(10) Patent No.: US 8,391,310 B2
(45) Date of Patent: Mar. 5, 2013

(54) WIRELESS BASE STATION AND METHOD OF CONTROLLING WIRELESS COMMUNICATIONS

(75) Inventors: Nobuhiko Miki, Yokohama (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1008 days.

(21) Appl. No.: 12/299,257

(22) PCT Filed: Apr. 27, 2007

(86) PCT No.: PCT/JP2007/059209
§ 371 (c)(1),
(2), (4) Date: Feb. 17, 2009

(87) PCT Pub. No.: WO2007/129617
PCT Pub. Date: Nov. 15, 2007

(65) Prior Publication Data
US 2009/0219872 A1  Sep. 3, 2009

(30) Foreign Application Priority Data

May 1, 2006  (JP) ................................. 2006-127989

(51) Int. Cl.
*H04L 12/28*  (2006.01)
(52) U.S. Cl. ........................... 370/431; 370/329; 714/748
(58) Field of Classification Search .................. 370/431, 370/329; 714/748, 750, 751
See application file for complete search history.

(56) References Cited

U.S. PATENT DOCUMENTS

| | | | |
|---|---|---|---|
| 2007/0211660 A1* | 9/2007 | Teague | 370/329 |
| 2007/0223404 A1* | 9/2007 | Khan et al. | 370/278 |
| 2007/0238462 A1* | 10/2007 | Pedersen | 455/436 |
| 2008/0133995 A1* | 6/2008 | Lohr et al. | 714/748 |
| 2010/0211840 A1* | 8/2010 | Kim et al. | 714/748 |

FOREIGN PATENT DOCUMENTS

WO  2005/060145 A1  6/2005

OTHER PUBLICATIONS

International Search Report w/translation from PCT/JP2007/059209 dated Jul. 24, 2007 (4 pages).
Written Opinion from PCT/JP2007/059209 dated Jul. 24, 2007 (4 pages).

(Continued)

*Primary Examiner* — Luat Phung
(74) *Attorney, Agent, or Firm* — Osha Liang LLP

(57) ABSTRACT

A wireless base station is disclosed. The wireless base station includes a traffic-identifying section which determines a type of traffic of data input; a resource manager and allocator which allocates, for the data input, a wireless resource at constant periods and in a constant pattern when the data input is of a type of traffic that is suitable for periodic allocation, and successively allocates a wireless resource available, for traffic of a type other than the type of the traffic that is suitable for the periodic allocation; and a retransmission-control switching unit which applies synchronous retransmission control for the type of the traffic that is suitable for the periodic allocation, and applies asynchronous retransmission control for the traffic of the other type when there is a retransmission request.

8 Claims, 6 Drawing Sheets

OTHER PUBLICATIONS

Motorola, VoIP and HARQ for E-UTRA + TP; 3GPP TSG RAN1#44, R1-060397; Feb. 9, 2006; UTL:http://www.3gpp.org/ftp/tsg_ran/WG1_RL1/TSGR1_44/Docs/R1-060397.zip (7 pages).

Ericsson; Persistent Scheduling for E-UTRA; 3GPP TSG RAN1 LTE Ad Hoc; R1-060099; Jan. 19, 2006; URL:http://3gpp.org/ftp/tsg_ran/WG1_RL1/TSGR1_AH/LTE_AH_January-06/Docs/R1-060099.zip (2 pages).

3GPP TS 25.212 V7.0.0; "Multiplexing and Channel Coding (FDD)"; Mar. 2006 (84 pages).

Japanese Office Action for Application No. 2006-127989, mailed on Nov. 29, 2011 (5 pages).

Samsung, "HARQ Operation", Joint RAN WG1 and RAN WG2 on LTE, R2-061000, Athens, Greece, Mar. 27-31, 2006.

NTT DOCOMO, "Hybrid ARQ Scheme in E-UTRA Downlink", 3GPP TSG-RAN WG1 LTE Ad Hoc Meeting, R1-060211, Helsinki, Finland, Jan. 23-25, 2006.

* cited by examiner

WIRELESS BASE STATION AND METHOD OF CONTROLLING WIRELESS COMMUNICATIONS

BACKGROUND OF THE INVENTION

1. Field of the Invention

The present invention relates to techniques for controlling wireless communications, and, more specifically, to a wireless base station and a method of controlling wireless communications that allow switching between automatic repeat request (ARQ) modes according to the type of traffic.

2. Description of the Related Art

A hybrid ARQ is a technique wherein an error-correcting technique is added to existing ARQ functions (automatic error detection and retransmission request). In the hybrid ARQ, an error-correcting code is transmitted in advance to perform error correction, making it possible to reduce the number of packet retransmissions.

There are two types of schemes in the hybrid ARQ as shown in FIG. 1. One is called synchronous ARQ, while the other is called an asynchronous ARQ.

The synchronous ARQ, as shown in (a) of FIG. 1 is a scheme in which retransmission is performed at predetermined retransmission timings. For example, assuming a packet roundtrip time (RTT: Round Trip Time) of 6 TTIs (Transmission Time Intervals), when the transmit packet in a TTI segment of #0 (S00) is detected as an error, it can be retransmitted only at S10 and S20, each corresponding to an occurrence of #0 every 6 TTIs. In other words, retransmission is performed at frames, each of which has a number which is an integer multiple of the RTT.

The synchronous ARQ has its transmission timings predetermined. Therefore, the process number, which shows the original transmit packet for the retransmit packet, does not have to be transmitted as a control bit, advantageously allowing a reduced overhead. Moreover, the process is advantageously easy.

However, as the retransmission timings are constrained, there is a disadvantage that the flexibility of scheduling in allocating transmit data to TTIs is small. Moreover, if transmission after 1 RTT is not successful, waiting for retransmission at least until after 2 RTTs is needed, possibly causing an increased delay.

The asynchronous ARQ as shown in (b) in FIG. 1 is a retransmission scheme wherein a retransmit packet can be transmitted at 1 RTT or anytime after 1 RTT, so that the retransmission timings are not predetermined. For example, when the transmit packet at #0 (A00) is detected as an error, the retransmission may be performed at A10 or any TTI after A10 (A10 to A25). The asynchronous ARQ is used in HSDPA (for example, see 3GPP TS25.212, "Multiplexing and channel coding (FDD)").

Advantageously, the asynchronous ARQ has great scheduling flexibility. Moreover, if transmission after 1 RTT is not successful, it is not necessary to wait until after 2 RTTs. For example, transmission is possible after an (1 RTT+1) segment, so that the likelihood of the delay increasing is small. On the other hand, the process disadvantageously becomes complex. Moreover, the process number needs to be transmitted as control bits, resulting in a disadvantage of increased overhead.

On the other hand, for allocating a wireless resource to an initial-transmit packet, persistent scheduling is known, which allocates wireless resources in constant periods and in a predetermined pattern, as shown in FIG. 2. The persistent scheduling is effective in applications such as real-time voice communications, etc., in which packets arrive at constant speed (ie., at constant intervals), communications are conducted at low rate, and overhead reduction is needed.

SUMMARY OF THE INVENTION

Problem(s) to be Solved by the Invention

As described above, the persistent scheduling, shown in FIG. 2, is suitable for transmitting traffic in which packets arrive periodically, and allowable delay is limited. Then, the synchronous ARQ, shown in FIG. 1(a) is suitable for the retransmission control of such traffic. The reason is that the corresponding relationships may be uniquely defined between periodic wireless-resource allocation and the synchronous ARQ, which retransmits at predetermined retransmission timings (for example, every RTT).

However, otherwise, for example where packet generating intervals are not uniquely defined, or data is communicated such that the volume of transmitted data and the required transmission rate, etc., vary, more flexible and quicker scheduling allocation and retransmission control, rather than a relative reduction, are desired.

Thus, the present invention aims to make appropriate use of the synchronous ARQ and the asynchronous ARQ according to the type of traffic to allow both reduced overhead and a quicker retransmission process and improve the overall system communications efficiency.

Moreover, the present invention aims to provide a wireless communications method which dynamically switches between the ARQ automatic retransmission control modes to apply depending on the type of traffic, and a wireless communications apparatus which performs such control.

Means for Solving the Problem

In order to solve the problems as described above, for traffic suitable for periodic allocating, for example, low-rate traffic at constant speed, the synchronous ARQ and persistent scheduling are combined to efficiently reduce overhead, and, for retransmission control of other traffic (such as a channel over which data is communicated), the asynchronous ARQ is applied to reduce retransmission delay and avoid collisions.

According to one aspect of the present invention, a wireless base station which switches between retransmission control modes according to a type of traffic is provided. The wireless base station includes a traffic-identifying section which determines a type of traffic of data input; a resource manager and allocator which allocates, for the data input, a wireless resource at constant periods and in a constant pattern when the data input is of a type of traffic that is suitable for periodically allocating, and successively allocating a wireless resource available for traffic of a type other than the type of traffic that is suitable for the periodic allocation; and a retransmission-control switching unit which applies synchronous retransmission control for the type of traffic that is suitable for the periodic allocation, and applies asynchronous retransmission control for the traffic of the other type when there is a retransmission request.

For example, the low-rate constant-speed communications traffic is determined to be the suitable for periodic allocation.

In a preferable embodiment, the wireless-resource manager and allocator allocates, to a retransmit packet, a wireless resource (a frequency block) which is different from a previous wireless resource at predetermined retransmission timings when the synchronous retransmission control is applied by the retransmission-control switching section.

On the other hand, the wireless-resource manager and allocator allocates a wireless resource which is available to the retransmit packet at an arbitrary timing which is a predetermined time after an initial packet transmission when the asynchronous retransmission control is applied by the retransmission-control switching section.

Advantage of the Invention

The above features make it possible to reduce overhead in traffic suitable for periodic allocation, as well as to reduce retransmission delay and the likelihood of collision in aperiodic traffic.

DESCRIPTION OF THE PREFERRED EMBODIMENTS

Description of Notations 10 transmitting wireless-communications apparatus (wireless base station); 11 input-data accepting section; 12 traffic-identifying section; 13 retransmission-request signal accepting section; 15 scheduler; 16 resource manager and allocator; 17 retransmission-control switching section; 19 transmit-signal generator; 20 receiving wireless-communications apparatus (mobile station); 21 traffic sorter; 22 aperiodic-traffic demodulator; 23 periodic-traffic demodulator; 24, 25 error detector; 27 retransmission-request signal generator Best Mode of Carrying Out the Invention A description is given below with regard to preferred embodiments of the present invention, with reference to the drawings.

Figure 1:
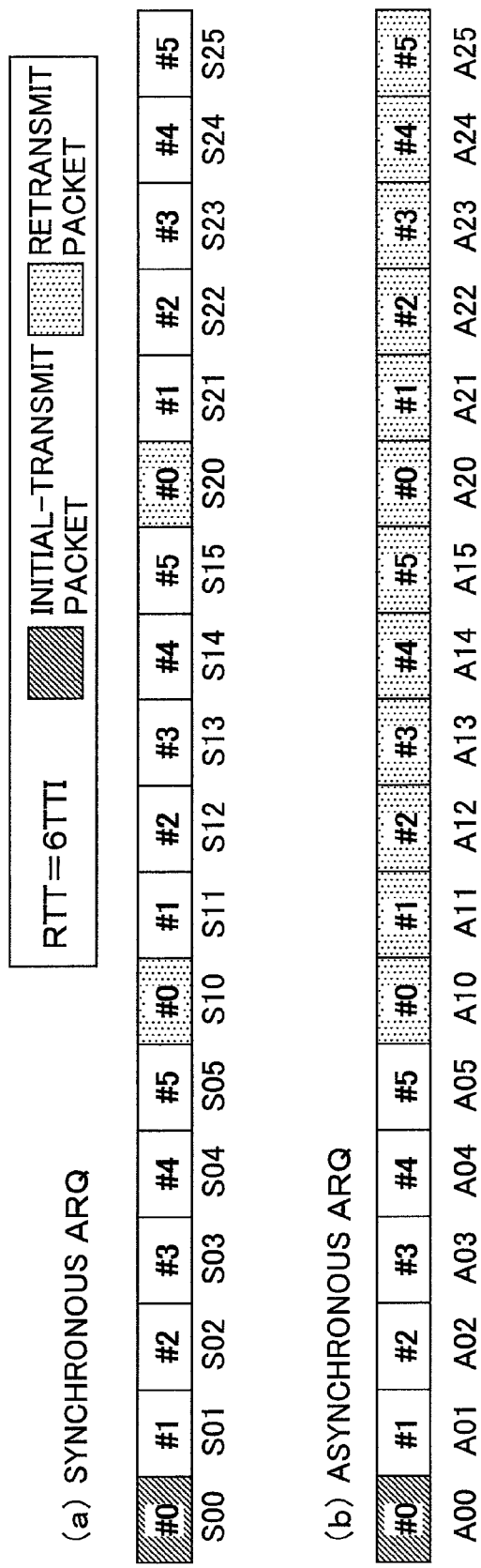
FIG. 1 illustrates two known hybrid ARQ schemes.
Figure 2:
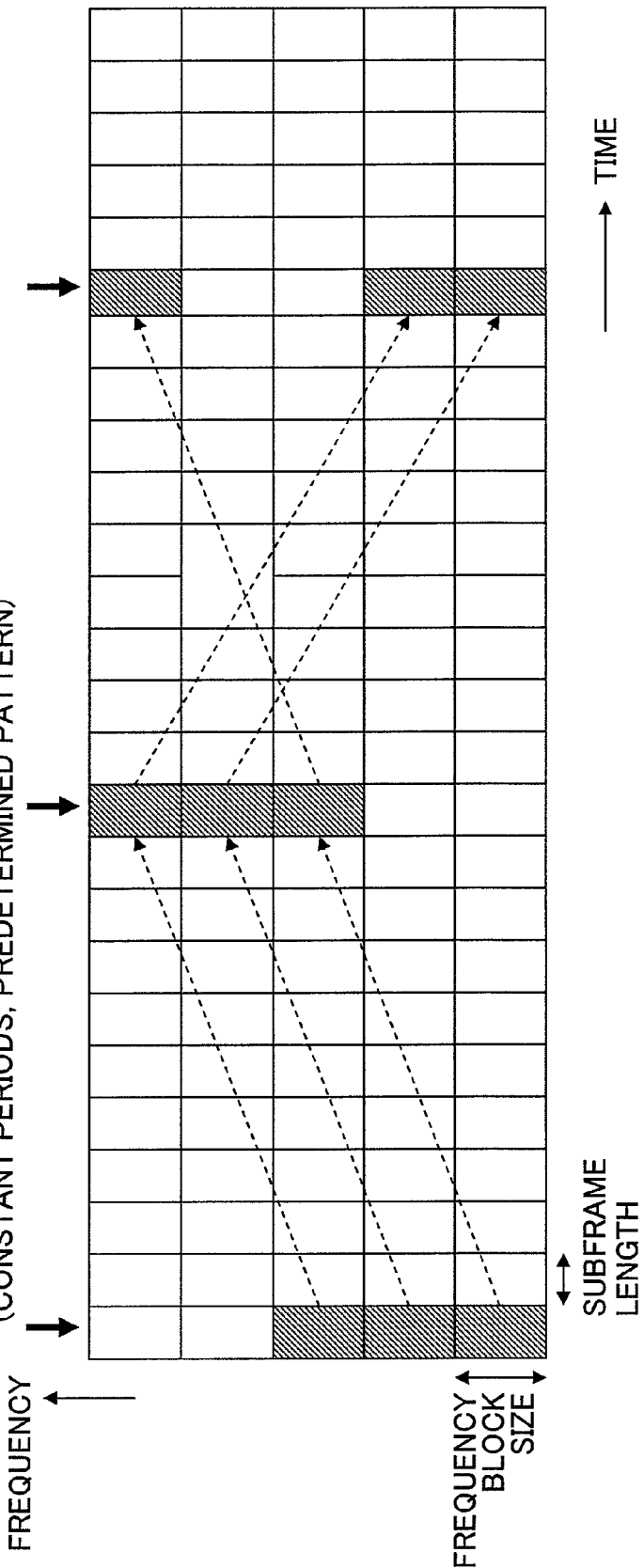
FIG. 2 illustrates an exemplary resource allocation by persistent scheduling.
Figure 3:
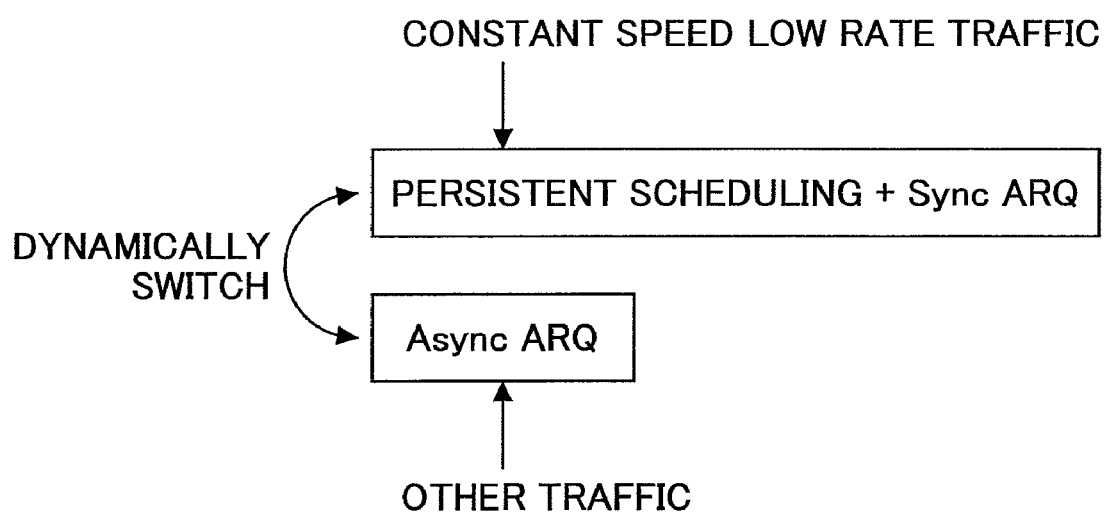
FIG. 3 is a diagram showing a basic concept of the present invention.

FIG. 3 is a diagram illustrating a basic concept of the present invention. For constant-speed low-rate traffic such as voice communications and picture phone (VoIP), packets are transmitted based on persistent scheduling, by which wireless resources are allocated in constant periods. When a retransmission request due to detecting an error caused by a packet loss, etc., is received from the receiver, synchronous ARQ is applied to transmit a retransmit packet at predetermined retransmission timings.

In such traffic suitable for periodic allocation (below "periodically-allocated traffic", or simply "periodic traffic"), the proportion of control bits to the transmit-packet size is relatively large. When synchronous ARQ is applied to periodic traffic, as the retransmission timings are known in advance, there is no need to add information bits which indicate which transmit packet the retransmission is for, resulting in greatly reduced overhead.

On the other hand, in retransmission control for other traffic such as data-communications traffic (below called "aperiodically-allocated traffic", or simply "aperiodic traffic"), asynchronous ARQ is applied and an arbitrary TTI available is used to retransmit packets quickly. In a data-communications channel, the effect on overhead is relatively small. Thus, asynchronous ARQ is applied to increase the effect on collision avoidance.

In this way, according to the type of traffic, the automatic retransmission control mode is switched between the synchronous ARQ and the asynchronous ARQ to allow both reduced overhead and a quick retransmission process.

Figure 4:
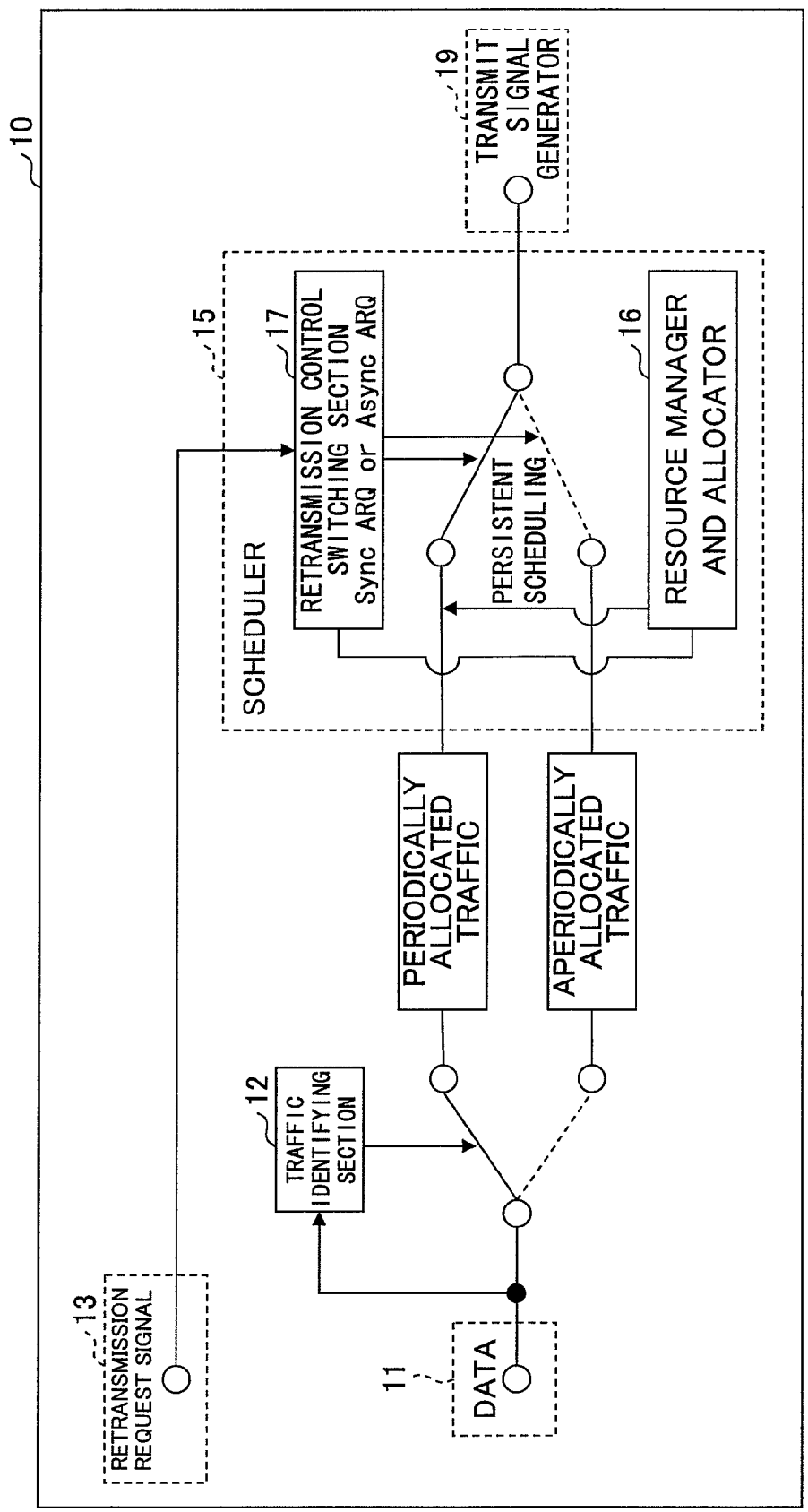
FIG. 4 is a schematic block diagram illustrating a configuration of a wireless base station as an example of a transmitting wireless-communications apparatus to which the present invention is applied.

FIG. 4 shows a schematic configuration of a wireless base station as an example of a transmitting wireless communications apparatus for controlling ARQ switching as shown in FIG. 3. The wireless base station 10 includes: an input-data accepting section 11, which accepts data from each user; a traffic-identifying section 12, which identifies the type of traffic; and a resource manager and allocator 16, which allocates wireless resources according to the identified type of traffic and manages resource utilization.

If the input user data is identified as periodic traffic, the resource manager and allocator 16 preferentially allocates frequency resources in predetermined intervals. If the input data is not periodic traffic, or in other words, if the input data is the aperiodic traffic, the resource manager and allocator 16 successively allocates in decreasing order of the condition of available resource blocks.

The wireless base station 10 further includes: a retransmission request signal accepting section 13, which accepts a retransmission request signal; and a retransmission control switching section 17, which switches between retransmission control modes according to the type of traffic. If the retransmission request is being made for periodic traffic, synchronous ARQ is applied for retransmission control. For periodic traffic, the received retransmission request is known to be always for a packet which has been transmitted a predetermined time before. Thus, the resource manager and allocator 16 allocates a resource block at a timing which is a predetermined interval after the previous transmission.

On the other hand, if the retransmission request is a request for aperiodic traffic, the resource manager and allocator allocates resource blocks available in descending order of the resource condition.

The resource manager 16 and the retransmission control switching section 17 make up the scheduler 15.

The transmit-signal generator 19 generates a transmit signal based on scheduling which has been performed taking into account retransmission control according to the traffic type, and transmits the signal via an antenna (not shown). The input user data (not shown) needs to be channel coded and data modulated before the wireless resources can be allocated.

Figure 5:
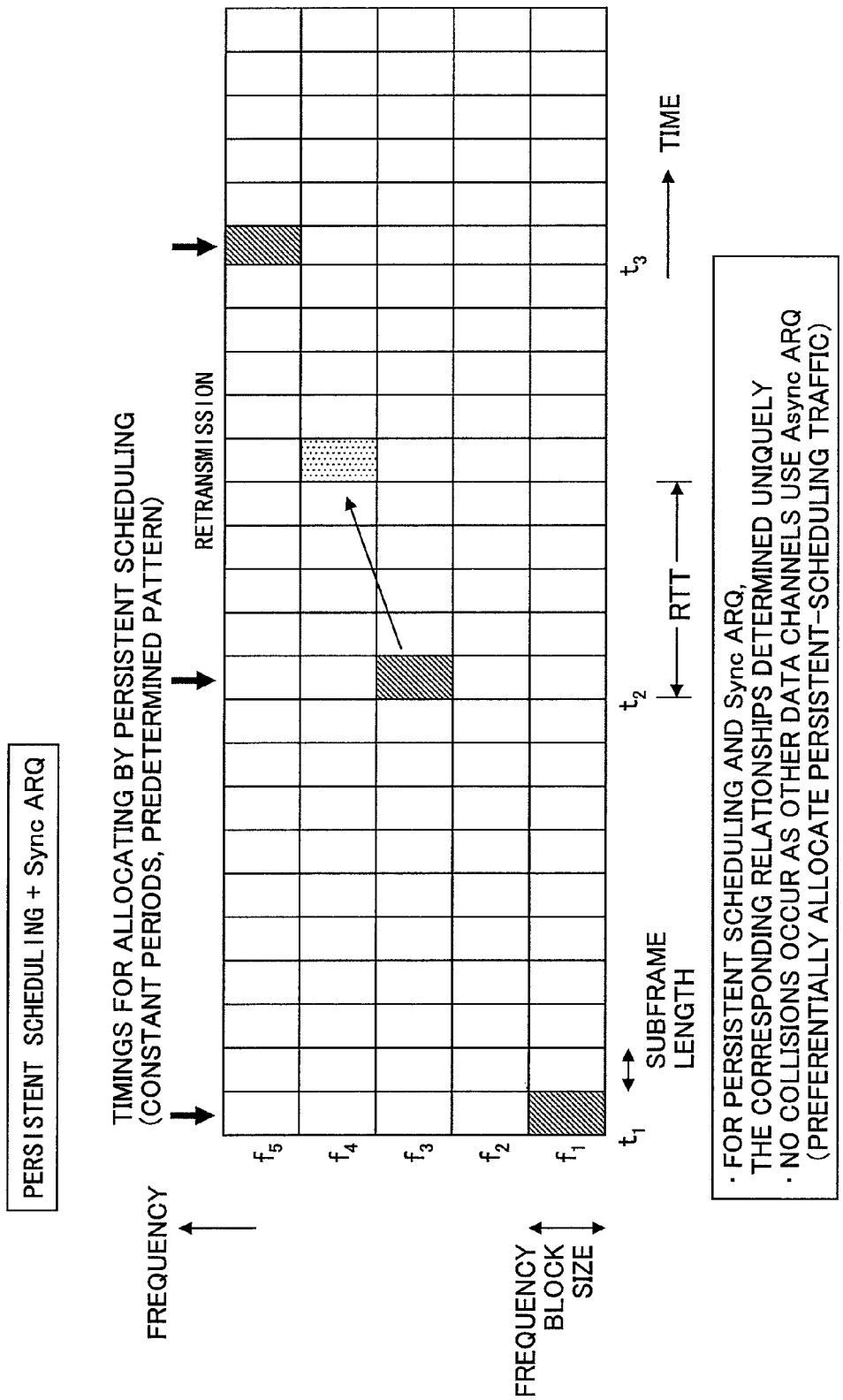
FIG. 5 is a diagram showing a combination of persistent scheduling and synchronous ARQ to apply to periodic traffic.

FIG. 5 is a diagram showing an example of persistent scheduling and synchronous ARQ for periodic traffic. For example, as shown in an oblique line, wireless resource blocks are allocated, in constant periods and in predetermined patterns, to data of users conducting VoIP communications. A frequency block f1 is allocated to a transmit data block in a TTI (in this example, 1 TTI=1 subframe) at time t1, a frequency block f3 is allocated in a TTI after a constant period at time t2, and further a frequency block f5 is allocated in a TTI after the constant period at time t3.

Assume that an error in a data block transmitted at the time t2 TTI is detected at the receiver. In this case, it is known that a retransmission request is to be made after one RTT. Thus, the first retransmission timing for the data block as described above is set as one RTT afterward. Then, at the time of retransmitting, a frequency block f4, which is different from the initial transmission, is allocated to improve the performance since, if the same frequency resources were used, the likelihood of the error occurring again would be high.

If the first retransmission also fails, a second retransmission is to be performed at the timing of a subsequent RTT. In this case, it is also desirable to allocate a different frequency block.

The corresponding relationships between the frequency block used in the first transmission and the frequency blocks used in first and subsequent retransmissions may be predetermined and provided in a table, etc.

Persistent scheduled resource blocks available are allocated to aperiodic traffic. (In the same TTI, one or more resource blocks may be allocated.) The retransmission request, in this case, includes an information bit indicating a transmit packet to be retransmitted. Thus, a corresponding packet in a buffer is re-read based on the information described above to allocate, at an earliest timing possible after receiving the retransmission request, an available resource block having a better condition.

Figure 6:
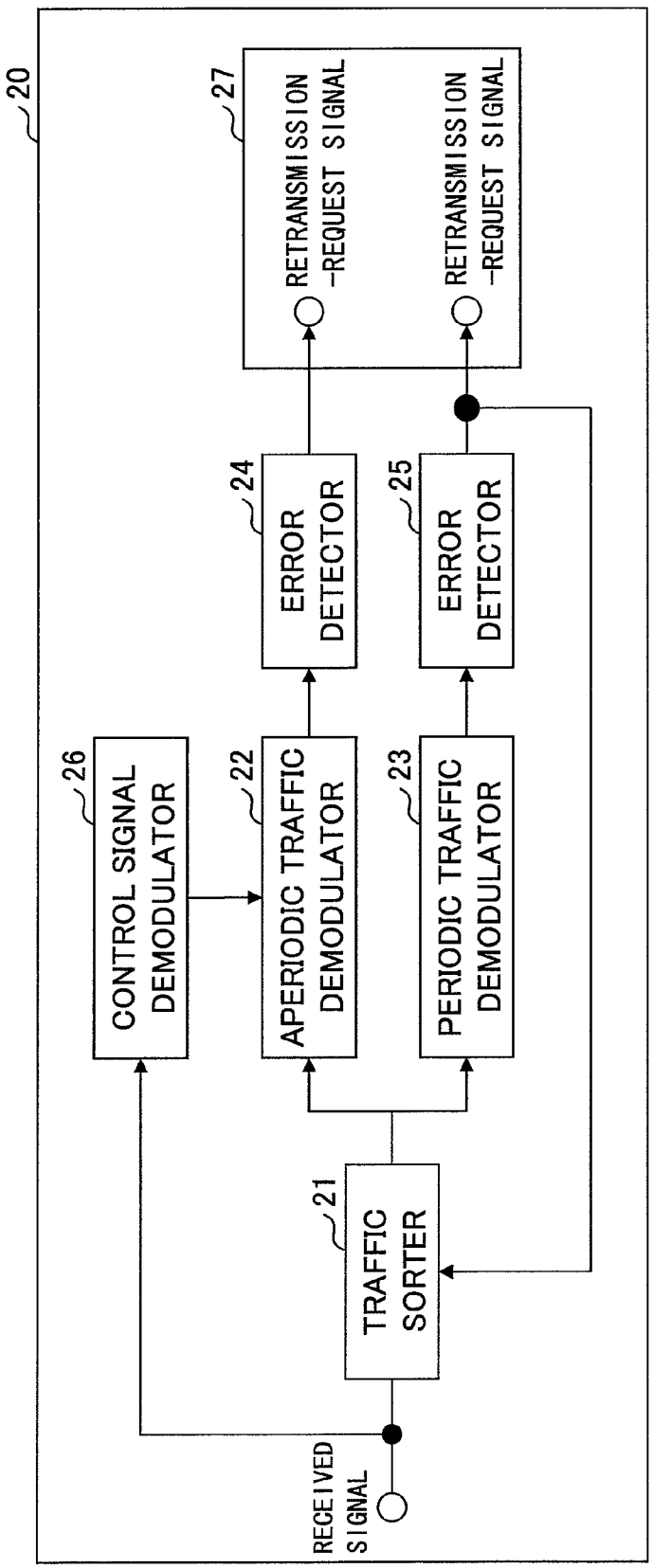
FIG. 6 is a schematic block diagram illustrating a configuration of a mobile station as an example of a receiving wireless-communications apparatus to which the present invention is applied.

FIG. 6 shows a schematic configuration of a mobile station 20 as an example of a receiving wireless communications apparatus. A mobile station 20 has a traffic sorter 21, which sorts traffic. The mobile station 20 performs demodulation and error detection according to the sorted traffic. Thus, the mobile station 20 includes an aperiodic traffic demodulator 22 and the corresponding error detector 24; and a periodic traffic demodulator 23 and the corresponding error detector 25. Based on the respective error detection results, retransmission-request signals are generated at a retransmission-request signal generator 27.

When an aperiodic-traffic error is detected at the error detector 24, the retransmission-request signal generator 27 adds an information bit showing a packet requested to be retransmitted to generate the retransmission-request signal.

When a periodic-traffic error is detected at the error detector 25, the retransmission-request signal generator 27 generates the retransmission-request signal without adding the information bit showing the packet requested to be retransmitted.

The error detection result for the periodic traffic is fed back to the traffic sorter 21. Based on the fed-back information, the traffic sorter 21 can anticipate that a retransmit packet is to arrive in a predetermined time period.

On the other hand, a control signal retrieved from received signals is input to a control signal demodulator 26 to demodulate the control signal, and corresponding aperiodic traffic is demodulated based on the demodulated control signal.

As described above, in the embodiment of the present invention, a control scheme by persistent scheduling and synchronous ARQ and a control scheme by asynchronous ARQ are used appropriately according to the type of traffic. As a result, reduced overhead in constant-speed low-rate communications as well a reduced retransmission delay and a reduced likelihood of collision in data communications can be achieved.

The present application claims priority based on Japanese Patent Application No. 2006-127989 filed on May 1, 2006 with the Japanese Patent Office, the entire contents of which are hereby incorporated herein by reference.

The invention claimed is:

1. A wireless base station, comprising:
a traffic-identifying section which determines a type of traffic of data input;
a resource manager and allocator which allocates, for the data input, a wireless resource at constant periods and in a constant pattern when the data input is of a type of traffic that is suitable for periodic allocation, and successively allocates a wireless resource available, for traffic of a type other than the type of the traffic that is suitable for the periodic allocation;
a retransmission-control switching unit which applies synchronous retransmission control for the type of the traffic that is suitable for the periodic allocation, and applies asynchronous retransmission control for the traffic of the other type when there is a retransmission request; and
a retransmission-request signal accepting section which accepts the retransmission-request signal based on outputs of a first error detector and a second error detector,
wherein the wireless-resource manager and allocator allocates, to a retransmit packet, a wireless resource which is different from a previous wireless resource at predetermined retransmission timings when the synchronous retransmission control is applied by the retransmission-control switching section.

2. The wireless base station as claimed in claim 1, wherein the traffic-identifying section determines that constant speed and low-rate communications traffic is determined to be of the type of the traffic that is suitable for the periodic allocation.

3. The wireless base station as claimed in claim 1, wherein the wireless-resource manager and allocator allocates an available wireless resource to a retransmit packet at an arbitrary timing which is a predetermined time after an initial packet transmission when the asynchronous retransmission control is applied by the retransmission-control switching section.

4. A mobile terminal, comprising:
a traffic sorter which sorts received-signal traffic;
a first error detector which, when the received-signal traffic is aperiodic traffic, detects an error in the aperiodic traffic;
a second error detector which, when the received-signal traffic is periodic traffic, detects an error in the periodic traffic and feeds back the error detection result to the traffic sorter; and
a retransmission-request signal generator, which generates a retransmission-request signal based on outputs of the first error detector and the second error detector.

5. The mobile terminal as claimed in claim 4, wherein the retransmission-request signal generator adds an information bit, when an error is detected in the aperiodic traffic, to generate the retransmission-request signal, the information bit indicating a packet for which the error is detected; and generates, when an error is detected in the periodic traffic, the retransmission request signal without adding an information bit indicating a packet for which the error is detected.

6. A method of controlling wireless communications, comprising the steps of:
determining a type of traffic of data input;
allocating, to the data input, a wireless resource at constant periods and in a constant pattern when the data input is of a type of traffic that is suitable for periodic allocation, and successively allocating a wireless resource available for traffic of a type other than the type of traffic that is suitable for the periodic allocation;

accepting a retransmission request signal, based on outputs of a first error detector and a second error detector, generated by a retransmission-request signal generator;

applying, when there is a retransmission request, synchronous automatic retransmission control for the type of the traffic that is suitable for the periodic allocation, and applying asynchronous automatic retransmission control for the traffic of the other type; and allocating, to a retransmit packet, a wireless resource which is different from a previous wireless resource at predetermined retransmission timings when the synchronous retransmission control is applied.

7. The method of controlling wireless communications as claimed in claim 6, wherein in the step of determining the type of traffic, constant-speed low-rate communications traffic is determined to be the type of the traffic that is suitable for periodic allocation.

8. The method of controlling wireless communications as claimed in claim 6, further comprising the step of:

allocating, to a retransmit packet, an available wireless resource at an arbitrary timing which is a predetermined time after an initial packet transmission when the asynchronous retransmission control is applied.

* * * * *